United States Patent [19]
Deakyne et al.

[11] Patent Number: 5,506,052
[45] Date of Patent: Apr. 9, 1996

[54] FLUOROPOLYMER MATERIAL

[75] Inventors: Clifford K. Deakyne, Wilmington; Gregory P. Weeks, Hockessin, both of Del.

[73] Assignee: E. I. Du Pont de Nemours and Company, Wilmington, Del.

[21] Appl. No.: 336,119

[22] Filed: Nov. 4, 1994

Related U.S. Application Data

[63] Continuation-in-part of Ser. No. 47,391, Apr. 19, 1993, abandoned, which is a continuation of Ser. No. 821,567, Jan. 19, 1992, abandoned.

[51] Int. Cl.$^6$ ..................................................... B32B 19/00
[52] U.S. Cl. ........................... 428/363; 428/357; 428/397; 428/400; 428/402
[58] Field of Search ................................... 428/397, 400, 428/402, 357, 363

[56]                References Cited

U.S. PATENT DOCUMENTS

| | | | |
|---|---|---|---|
| 3,027,601 | 4/1962 | Barry | 18/57 |
| 3,627,859 | 12/1971 | Mesiti et al. | 264/49 |
| 4,163,742 | 8/1979 | Mansure | 260/42.17 |
| 4,414,356 | 11/1983 | Michel | 524/496 |
| 4,422,992 | 12/1983 | Michel | 264/106 |
| 4,724,251 | 2/1988 | Rock | 525/184 |
| 4,975,321 | 12/1990 | Gentile et al. | 428/294 |
| 5,364,699 | 11/1994 | Hollenbaugh, Jr. et al. | 428/357 |

*Primary Examiner*—Patrick J. Ryan
*Assistant Examiner*—Richard Weisberger

[57]              ABSTRACT

A process for the production of structural and semi-structural composites formed by compressing planar layers of nonwoven preform materials formed from aqueous blends of reinforcing fibers and thin thermoplastic fluoropolymer flake. The flakes have an irregular periphery with microfibrils extending therefrom, having a Canadian Standard Freeness greater than 800. The planar layers which are unconstrained in the in-plane direction are preconsolidated by heating the layer to above the melting point of the fluoropolymer, the applying pressure normal to the plane of the layer causing the fluoropolymer to flow thus orienting the fibers in the plane of the layer. The composites are useful in applications which require higher strength and/or modulus, and where chemical and/or heat resistance is needed, as in chemical processing.

1 Claim, 4 Drawing Sheets

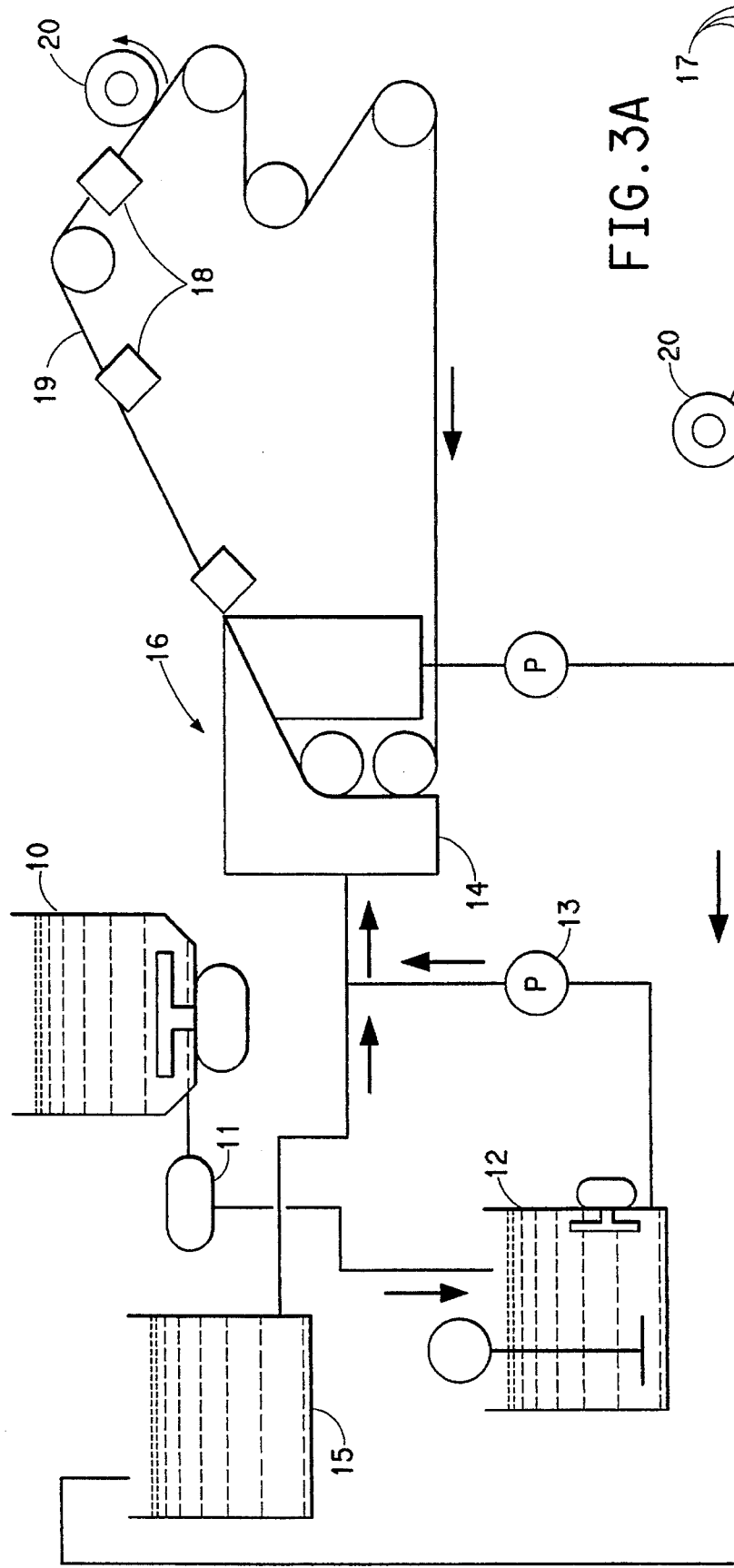
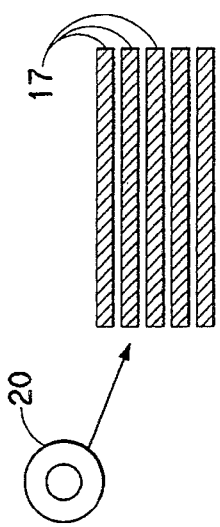
FIG. 3
FIG. 3A

FLUOROPOLYMER MATERIAL

BACKGROUND OF THE INVENTION

This is a continuation-in-part of application Ser. No. 08/047,391 filed Apr. 19, 1993, now abandoned, which in turn is a continuation of application Ser. No. 07/821,567 filed Jan. 16, 1992, now abandoned.

FIELD OF THE INVENTION

The production of composites containing reinforcing fiber and a fluoropolymer.

TECHNICAL BACKGROUND

Polymeric composites consisting of a matrix resin (including fluoropolymers) and a reinforcing fiber are well known in the art. By adding the fiber to the matrix resin certain properties of the resin alone are often improved. These properties can include creep resistance, tensile strength and modulus, and flexural strength and modulus. Generally speaking, the reinforcing fiber chosen has a higher tensile modulus and strength than the polymer alone. When a fluoropolymer is used as the matrix resin, as described herein, the resulting composite often has many of the attributes of fluoropolymers such as high temperature resistance and chemical resistance, which make such composites useful as parts, for example, for the chemical processing industry. It is the object of this invention to provide a method for the production of such fluoropolymer composites that exhibit improved properties.

U.S. Pat. Nos. 4,414,356 and 4,163,742 issued to Michel and Mansure, respectively, describe a process for making tetrafluoroethylene copolymer-graphite fiber composite by mixing the polymer and fiber together in a slurry and then removing the water to obtain an intimate mixture of fiber and polymer. It is also known that fluoropolymers have very low surface energy and are difficult to wet, especially as fine particulates, in aqueous media. Accordingly, the current art depends on the extensive use of organic solvents and emulsifying agents (as in the case of fluoropolymer dispersions) to overcome this obstacle. The amount of "wetting and dispersing" agents in such a slurry according to the art can be comparable to the weight of fluoropolymer resin. These organic dispersion aides must be recovered or disposed as waste. It is highly desirable to find a method for intimately co-dispersing finely divided fluorocarbon and other thermoplastic resins in aqueous media, essentially without the need for solvents and dispersing agents.

SUMMARY OF THE INVENTION

This invention involves a process for the production of a fluoropolymer-fiber composite, comprising: co-dispersing-thin thermoplastic fluoropolymer flakes having some irregular fibular structure extending from an irregular periphery and having a Canadian Standard Freeness of greater than 800 up to the Freeness test maximum of 883 and settling times of from 5 to 130 seconds with reinforcing fibers in an aqueous solution substantially free of other constituents (i.e., less than 1% based on weight of fluoropolymer solids to form a homogeneous slurry; feeding the slurry to a screen in a layer; removing water from the layer; drying the layer to form a self-supporting planar preform layer; optionally thermally tacking the web to improve dry strength for handling and preconsolidating said preform layer by heating said preform layer above the fluoro-polymer melt temperature, then applying sufficient pressure normal to the plane of said preform layer to cause the fluoropolymer to flow to form a solid preconsolidated sheet; and cooling said sheet.

This invention involves the use of a "fluoropolymer" as the matrix resin in a polymer-fiber composite. By fluoropolymer is meant an organic polymer that contains at least about 10% fluorine by weight, preferably at least about 45% fluorine by weight, and it is especially preferred if the polymer is perfluorinated, i.e., contains essentially no hydrogen or halogen other than fluorine bound to carbon. The fluoropolymer preferably is converted from a pellet form to unique flake structure advantageous for wet processing by means of a commercial disk refining process using a Sprout Waldron disk refiner with a specific refiner plate design. The flakes have an average size distribution of 250 microns and a thickness of 0.1 times the average length to width dimension.

The fibrous material used in the instant process may be any of a variety of fibers usually used for such purposes. Of course, the fiber must be stable under the process conditions, not decomposing oxidatively or thermally, or reacting with the fluoropolymer. Fibers often used for this purpose include, but are not limited to, glass, graphite (carbon), fluorinated graphite, aramid such as poly(p-phenylene-terephthtalamide), boron nitride, silicon carbide, polyester, and polyamide. Graphite and fluorinated graphite are preferred fibers, and fluorinated graphite is especially preferred.

The fibers may be in a variety of forms for the present process. Preferably, the fiber may simply be chopped fiber that is mixed with the aqueous dispersion.

As is well known to those skilled in the art, polymer-fiber composites with superior properties are produced when there is good adhesion between the polymer and the fiber. It is common in the art to use fibers that have been surface treated with materials to improve this adhesion, and the use of such coated fibers is contemplated herein. Such coated fibers are articles of commerce and individual manufacturers make recommendations as to which fiber (and coating) should be used with any particular polymer.

A preferred route to achieving a highly homogeneous distribution of the fiber and the fluoropolymer is to slurry the two together in water as described in U.S. Pat. No. 4,163, 742. By such means blends of fibers and particles can be converted to an open porous mat.

This porous structure is then preconsolidated by heating above the melt temperature of the fluoropolymer but below the melt temperature of the fibers, then applying sufficient pressure normal to the plane of the structure while the material is unconstrained in the in-plane directions to cause the fluoropolymer to flow and orient the fibers by means of the flow in the plane of the structure. The structure is cooled under pressure to form a thin solid consolidated sheet.

BRIEF DESCRIPTION OF THE DRAWINGS

FIGS. 3 and 3A are schematic illustrations of the wet-laying process of this invention.

DETAILED DESCRIPTION OF THE PREFERRED EMBODIMENT

Figure 1:
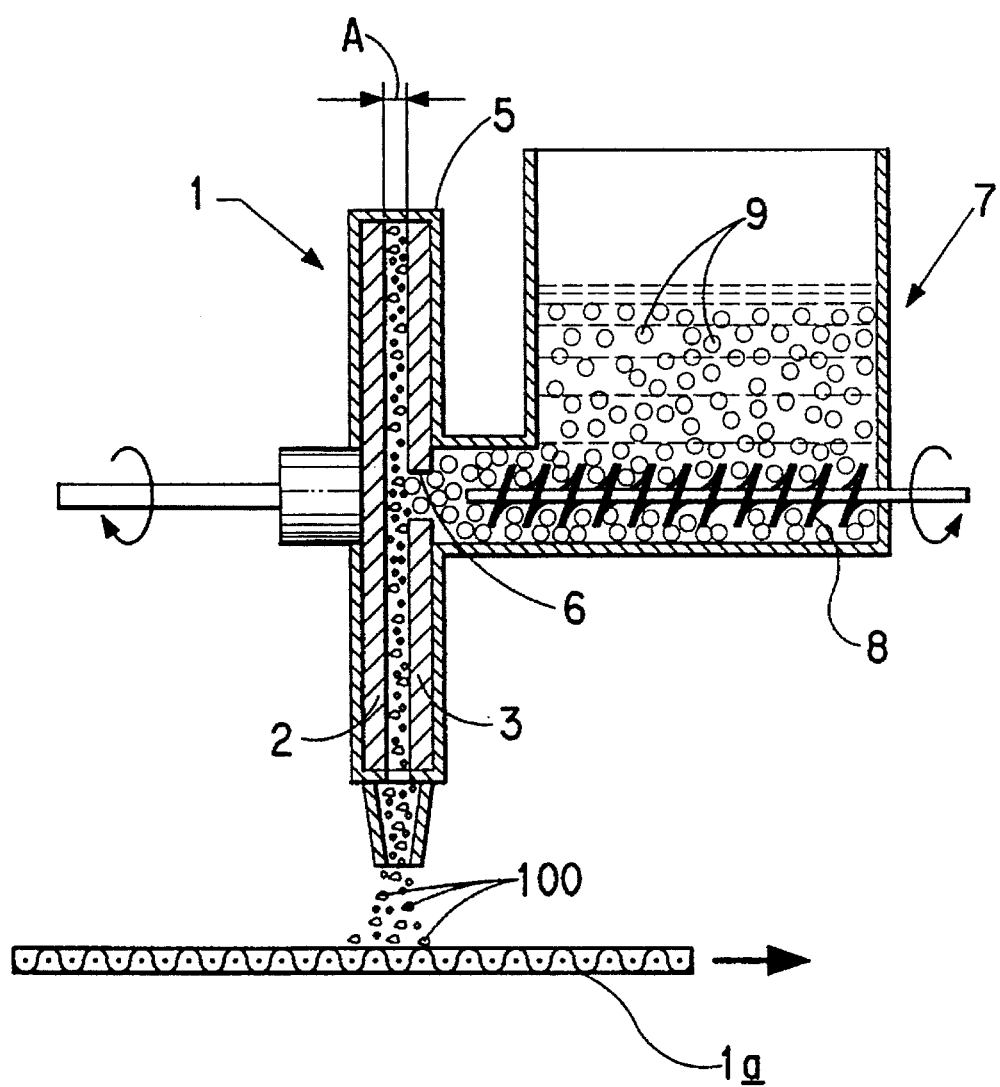
FIG. 1 is a schematic elevation view in section of a disk refining apparatus useful for making the fluoropolymer flakes of this invention.

Referring to FIG. 1, a disk refiner 1 of the type manufactured by Sprout Waldron includes a driven grooved plate 2 separated from a grooved plate 3 fixed to the disk refiner housing 5 by a distance A. A hole 6 through the center of plate 3 is in communication with the material feeder 7 which includes a driven screw 8. In operation, fluoropolymer pellets 9 are fed in a water slurry by means of screw 8 through opening 6 in plate 3 into the disk refiner. The pellets are discharged from the disk refiner in the form of a pulp composed of thin flakes 100 where it is collected on screen 1a.

Figure 2:
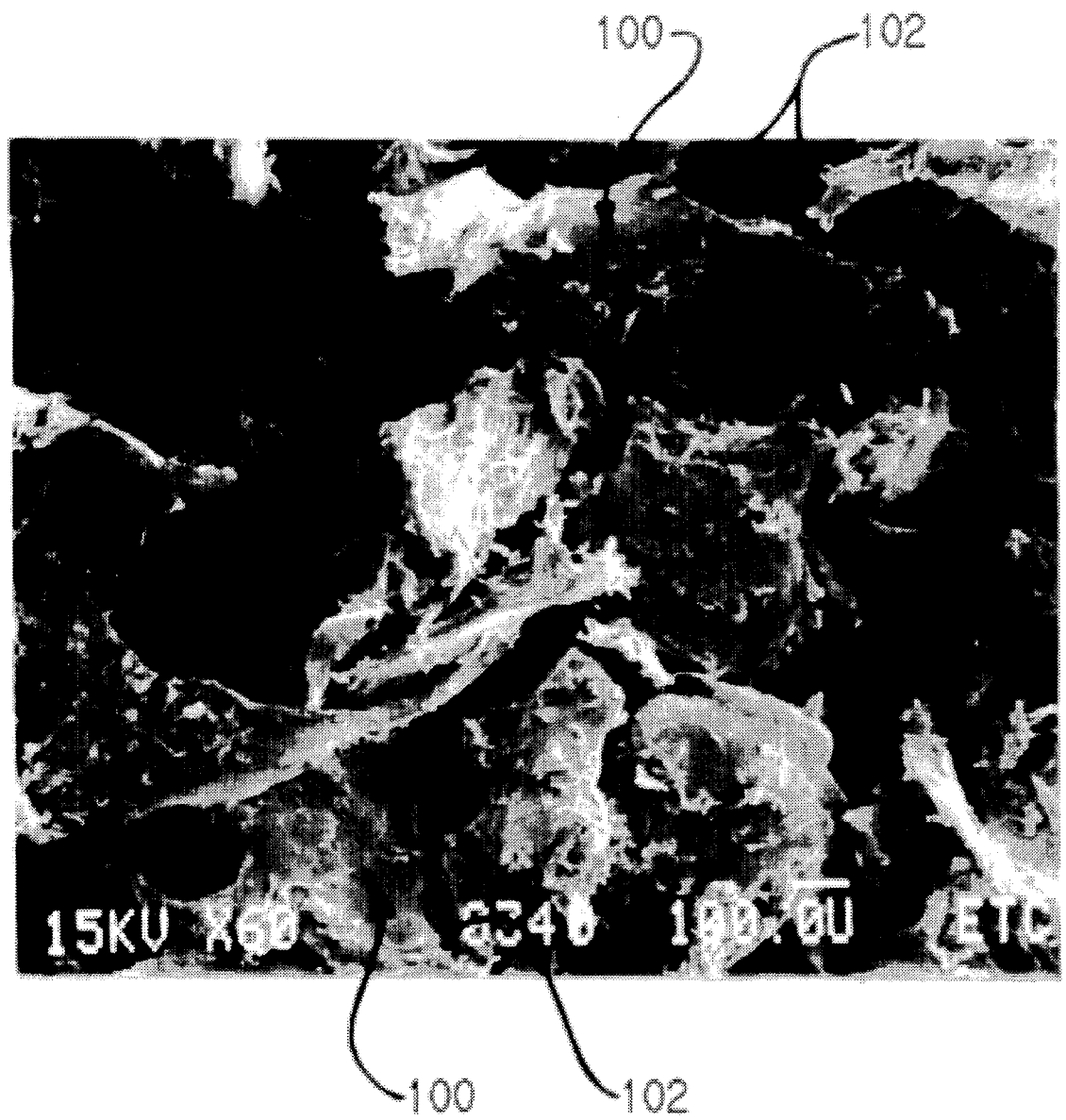
FIG. 2 is a photomicrograph of fluoropolymer flakes of this invention.
Figure 4A:
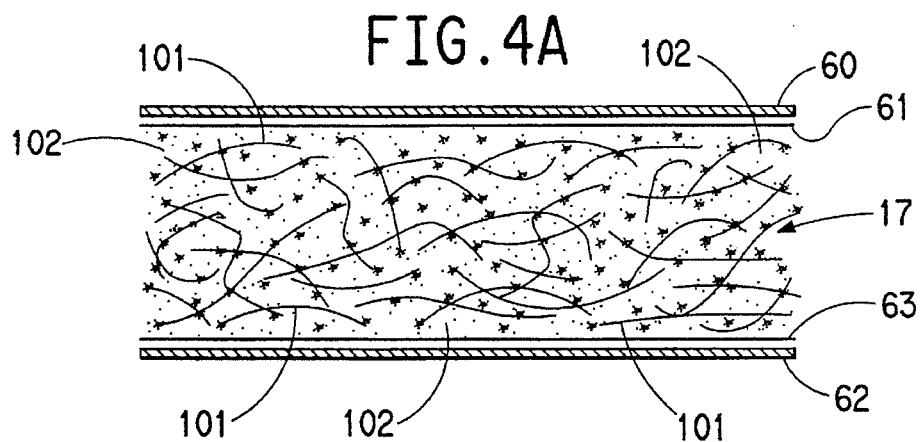
FIGS. 4A, 4B, 4C and 4D are schematic illustrations of composites at various degrees of consilidation each comprising blends of reinforcing fibers and thin thermoplastic fluoropolymer flakes.
Figure 4B:
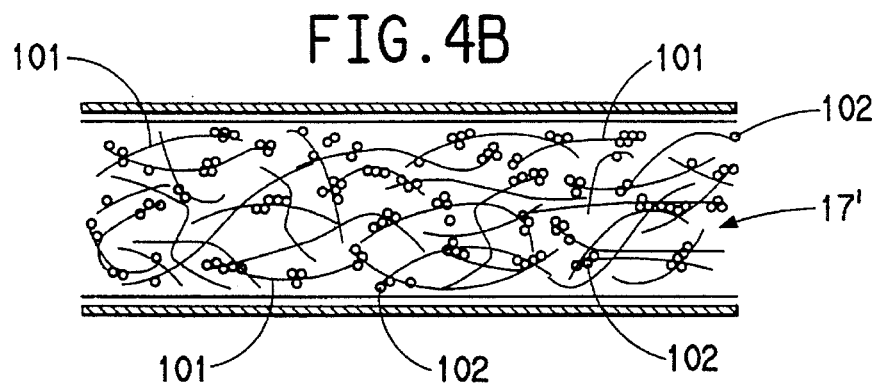
Figure 4C:
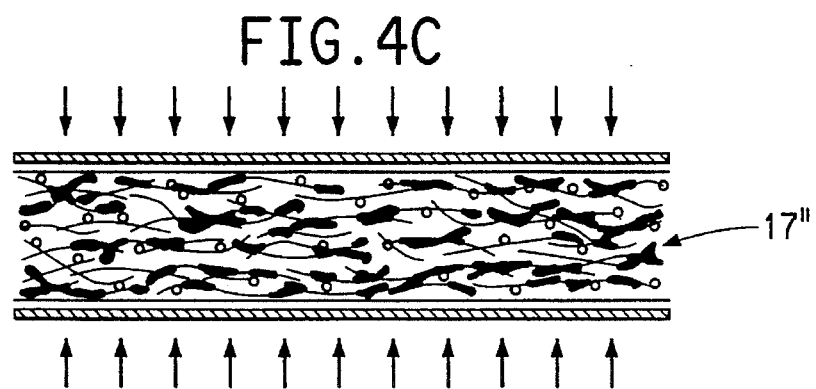
Figure 4D:
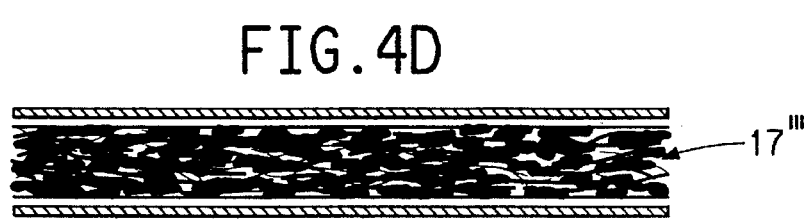

The film-like flakes 100 are shown in FIG. 2 to have an irregular periphery with some fibular structures 102 extending from the periphery.

As best shown in FIGS. 3 and 3A, the wet laying process of this invention utilizes paper-making equipment and generally includes a pulper 10, an agitated supply tank 12, the head box 14 of an inclined wire paper machine 16, a dewatering section 18, and a windup or driven spool 20. An optional forced air dryer oven (not shown) may also be used. In operation, fibers and fluoropolymer fiber-like flakes are dispersed in water in pulper 10. The slurry is pumped via pump 11 from the pulper to an agitated supply tank 12. Feed stock from the supply tank is then pumped by means of pump 13 to the head box 14 where dilution water is added from tank 15 reducing stock consistency by a factor of 5. The slurry is drained through the wire in the usual manner and dewatered by passing over suction slots 18 in the dewatering section. The dewatered sheet 19 is then wound in damp form on driven spool 20. The porous sheet wound on the spool 20 is unwound in layers 17 and air dried as schematically shown in FIG. 3A.

| | Equipment Description | | |
|---|---|---|---|
| Element Number | Name | Model No. | Manufacturer |
| 10 | Pulper | GP 157 | Bird Machine Co., Inc. South Walpole, MA |
| 13 | Pump | 23B2-B | Gorman-Rupp Mansfield, OH |
| 16 | Papermaking Machine | Labor 23" | Neu Bruderhaus Reutlingen, W. Germany |

In the following Examples, Teflon® PFA is a registered trademark of and available from E. I. du Pont de Nemours and Company, Wilmington, Del., and is a polymer containing about 99 mole percent tetrafluoroethylene and 1 mole percent perfluoro(propyl vinyl ether). Hercules AS 1815 is a graphite fiber available from Hercules, Inc., Wilmington, Del. BASF Celion 6 ns in a graphite fiber from BASF, Inc., Charlotte, S.C.

TEST PROCEDURES

Freeness is determined by the TAPPI test T227 OM 85. The data obtained from this test are expressed as the familiar Canadian Standard Freeness numbers which represent the number of ml. of water which drain from the slurry under specified conditions.

Settling time for refined particles of PFA is determined by adding 10 grams of PFA particles to 180 ml. of water with 1 drop of detergent in a clear glass container with a sealed cap. The container is shaken three times and the time for materials to settle to the bottom of the container is measured with a stop watch. This is done 7 times for each sample and an average settling time is determined.

EXAMPLES

EXAMPLE 1

Using a commercial Sprout Waldron 12 inch laboratory disk refiner, model 105A, substantially as described in FIG. 1 driven at 1800 rpm with a combination of grooved plates, the position of the plates set at a distance of 0.001 inch from each other. The refiner is fitted with a conventional screw feeder and fitted with piping to provide a nominal 9 liters per minute process water flow through the feeder to the refiner housing where nominal ⅛ inch pellets of Teflon® PFA, resin are fed to the screw feeder at a rate of 25–50 pounds per hour, the refiner motor load is monitored to limit the feed rate by manual means to limit the motor load to 30% (motor idle load is 24%). The resultant refined thermoplastic fluoropolymer pulp of thin flakes discharging from the refiner is collected on a 100 mesh screen. The size distribution of thin flakes ranged from 50 to 700 microns in length/width with an average of approximately 250 microns, and the thickness of the flakes as measured by cross-sectional photomicrographs was less than 0.1 times the average length/width dimension. Photomicrographic inspection showed the individual flakes, irregular in planar dimension, with microfibrals extending from the edges. The thin flakes were observed to disperse easily in water with hand stirring with less than 1% surfactant.

A slurry of thin flakes made in this example are observed to have a Canadian Standard Freeness of about 880.

EXAMPLE 2

10 Grams of PFA of a particular particle size was put in a clear glass container with 180 ml. of water and 1 drop of detergent and the container was sealed. The container was shaken 3 times and the time for the particles to settle to the bottom of the container was measured with a stop watch. The shaking three times and settling time was repeated 7 times for each sample with the following results.

| Average Particle Size (Microns) | Settling Time (Seconds) | Settling Time Standard Deviation (Seconds) |
|---|---|---|
| 3300 | 1.03 | 0.38 |
| 450 | 5.89 | 2.21 |
| 300 | 39.00 | 16.00 |
| 250 | 130.00 | 21.00 |
| <50 | particles float | — |

What is claimed is:

1. A polyfluoroethylene thermoplastic flake having an irregular shaped periphery with irregular fibular structures extending therefrom, a plurality of said flakes having a size distribution of 50 to 700 microns, a settling time of 5 to 130 seconds in water, and a Canadian Standard Freeness greater than 800.

* * * * *